United States Patent Office 3,035,093
Patented May 15, 1962

3,035,093
SUBSTITUTED ALKYNYL UREAS

David J. Beaver, Richmond Heights, and Paul J. Stoffel, St. Louis, Mo., assignors to Monsanto Chemical Company, St. Louis, Mo., a corporation of Delaware
No Drawing. Filed Apr. 30, 1959, Ser. No. 809,922
9 Claims. (Cl. 260—553)

This invention relates to new and useful compounds and to a process of making the same. In particular this invention is concerned with new compounds of the structure (1)

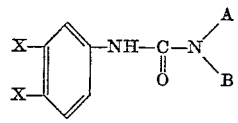

where X is a halogen selected from the group consisting of chlorine and bromine, A is an alkynyl radical having from 3 to 6 carbon atoms and B is a member selected from the group consisting of allyl and propynyl radicals. The preferred compounds of this invention are those in which B is an allyl radical.

The new compounds of this invention are useful as bacteriostats and may be prepared by reacting a 3,4-dihalophenylisocyanate with a secondary amine of the structure

where A and B have the same meaning as in (1) above. The reaction takes place readily at room temperature in a solvent medium such as ether to form the desired product which may be obtained by evaporating the solvent. Other solvents may be used such as benzene, petroleum ether, and toluene providing they are non-reactive with the reagents employed. Although the reaction takes place readily at room temperature, higher temperatures may be employed, e.g. up to the boiling point of the solvent used. Temperatures below room temperature may also be used but are somewhat impractical since the rate of reaction is reduced.

The compounds of this invention find particular utility as bacteriostats as evidenced by the following examples.

EXAMPLE I

Aliquots of each of the compounds set forth in Table I below were added to a sterile Sabourard's dextrose agar medium so as to give the concentrations listed in the table below. The agar was then poured into a test tube, allowed to harden, and inoculated with a culture of *Micrococcus pyogenes* var. *aureus* of standard resistance. After a 48 hour incubation period of 37° C. the test tubes were examined for the presence (+) or absence (−) of growth with the following results:

The group B compounds were included in the above table for the purpose of stressing the importance and criticality of the particular substituent present on the nitrogen atom. For example, an alkyl and an alkynyl substituent on the nitrogen (compounds II, III and VIII) are ineffective as bacteriostats. This is particularly surprising in the case of compound VIII which is an active herbicide. Moreover, where both substituents on the nitrogen are allyl (compound V) and in addition have chlorine substituents (compounds IV and VI), the compounds are useless as bacteriostats. Finally alkyl and chloroallyl compounds (compound VII) are also noted to be ineffective.

The present invention will be more completely understood by reference to the following additional examples.

EXAMPLE II

1-ALLYL-3-(3,4-DICHLOROPHENYL)-1-(2-PROPYL) UREA

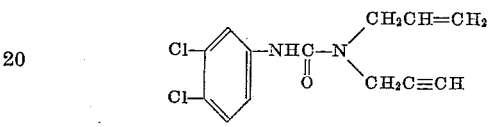

A solution of 18.8 g. (0.1 mole) of 3,4-dichlorophenyl-isocyanate in 50 ml. of ether is added with stirring to 9.5 g. (0.1 mole) of N-allyl-2-propynylamine. The exothermic reaction which results is essentially complete by the end of the addition. The ether is removed under vacuum and the 1-allyl-3-(3,4-dichloro phenyl)-1-(2-propynyl) urea is obtained as a viscous yellow syrup which boils at 180° C. at 2.5 mm. Hg. Yield=87.8% of theory. Aanalysis=percent chlorine calculated—25.03%; found 25.63%.

EXAMPLE III 1,1-BIS(2-PROPYNYL)-3-(3,4-DICHLOROPHENYL) UREA

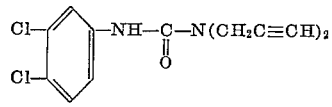

The procedure of Example II is repeated except that 18.8 g. (0.1 mole) of 3,4-dichlorophenylisocyanate in 50 ml. of benzene is reacted with 9.3 g. (0.1 mole) of bis(2-propynyl) amine and 1,1-bis(2-propynyl)-3-(3,4-dichlorophenyl) urea is obtained in good yield.

EXAMPLE IV

1-ALLYL-3-(3,4-DIBROMOPHENYL)-1-(2-PROPYNYL) UREA

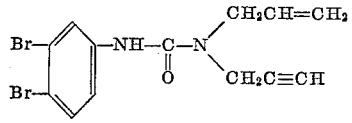

*Table I*

| Compound | Concentration, in parts per— | | | | | | |
|---|---|---|---|---|---|---|---|
| | 1T | 10T | 100T | 1M | 5M | 10M | 50M |
| Group A: | | | | | | | |
| I. 1-allyl-3-(3,4-dichlorophenyl)-1-(2-propynyl) urea | − | − | − | − | − | − | − |
| Group B: | | | | | | | |
| II. 1-propyl-3-(3,4-dichlorophenyl)-1-(2-propynyl) urea | + | | | | | | |
| III. 1-dodecyl-3-(3,4-dichlorophenyl)-1-(2-propynyl) urea | + | | | | | | |
| IV. 1-(3-chloroallyl)-3-(3,4-dichlorophenyl)-1-(3-chloroallyl) urea | + | | | | | | |
| V. 1-allyl-3-(3,4-dichlorophenyl)-1-allyl urea | + | | | | | | |
| VI. 1-(2-chloroallyl)-3-(3,4-dichlorophenyl)-1-(2-chloroallyl) urea | + | | | | | | |
| VII. 1-isopropyl-3-(3,4-dichlorophenyl)-1-(2-chloroallyl) urea | + | | | | | | |
| VIII. 1-isopropyl-3-(3,4-dichlorophenyl)-1-(2-propynyl) urea | + | | | | | | |

Legend: T=thousand; M=million; +=growth; −=no growth.

The procedure of Example II is repeated except that 27.7 g. (0.1 mole) of 3,4-dibromophenylisocyanate is used in place of the 3,4-dichlorophenylisocyanate and 1-allyl-3-(3,4-dibromophenyl)-1-(2-propynyl) urea is obtained in good yield.

From the foregoing examples, it is evident that the new compounds of this invention can be readily synthesized. Representative of other compounds which may be prepared by this method are:

1-allyl-3-(3,4-dichlorophenyl)-1-(3-butynyl) urea,
1-allyl-3-(3,4-dichlorophenyl)-1-(4-pentynyl) urea,
1-(3-butynyl)-3-(3,4-dibromophenyl) - 1 - (2 - propynyl) urea,
1-allyl-3-(3,4-dibromophenyl)-1-(5-hexynyl) urea,
1-(5-hexynyl)-3-(3,4-dichlorophenyl) - 1 - (2 - propynyl) urea,
1-allyl-3-(3,4-dibromophenyl)-1-(3-pentynyl) urea,
1-(4-pentynyl)-3-(3,4-dichlorophenyl) - 1 - (2-propynyl) urea,
1-allyl-3-(3,4-dichlorophenyl)-1-(5-hexynyl) urea, and the like.

While this invention has been described with respect to certain embodiments, it is not so limited and it is to be understood that variations and modifications thereof obvious to those skilled in the art may be made without departing from the spirit or scope of this invention.

What is claimed is:

1. A compound of the formula

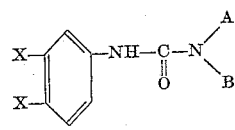

where X is a halogen selected from the group consisting of chlorine and bromine, A is an alkynyl radical having from 3 to 6 carbon atoms and B is a member selected from the group consisting of allyl and propynyl.

2. A compound of the formula

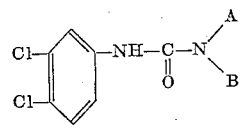

where A is an alkynyl radical having from 3 to 6 carbon atoms and B is allyl.

3. 1-allyl-3-(3,4-dichlorophenyl)-1-(2-propynyl) urea.
4. 1,1-bis(2-propynyl)-3-(3,4-dichlorophenyl) urea.
5. 1-allyl-3-(3,4-dichlorophenyl)-1-(3-butynyl) urea.
6. 1-allyl-3-(3,4-dichlorophenyl)-1-(4-pentynyl) urea.
7. 1-(3-butynyl) - 3 - (3,4 - dichlorophenyl)-1-(2-propynyl) urea.

8. The method of making a compound of the formula

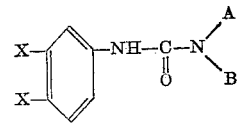

where X is a halogen selected from the group consisting of chlorine and bromine, A is an alkynyl radical having from 3 to 6 carbon atoms and B is a member selected from the group consisting of allyl and propynyl which comprises reacting 3,4-dihalophenylisocyanate with a secondary amine of the formula

where A is an alkynyl radical having 3 to 6 carbon atoms and B is a member selected from the group consisting of allyl and propynyl.

9. The method of preparing 1-allyl-3-(3,4-dichlorophenyl)-1-(2-propynyl) urea by reacting 3,4-dichlorophenylisocyanate with N-allyl-2-propynylamine.

References Cited in the file of this patent

UNITED STATES PATENTS 2,867,520     Beaver et al.  --------------- Jan. 6, 1959

OTHER REFERENCES

Beaver et al.: J. Am. Chem. Soc., vol. 79, pages 1236–1245 (1957).

Doub et al.: Journ. Am. Chem. Soc., vol. 80, pages 2205–17 (1958).